Sept. 1, 1925.
H. C. PRIEBE
CAR TRUCK
Filed May 27, 1924    2 Sheets-Sheet 1
1,551,905
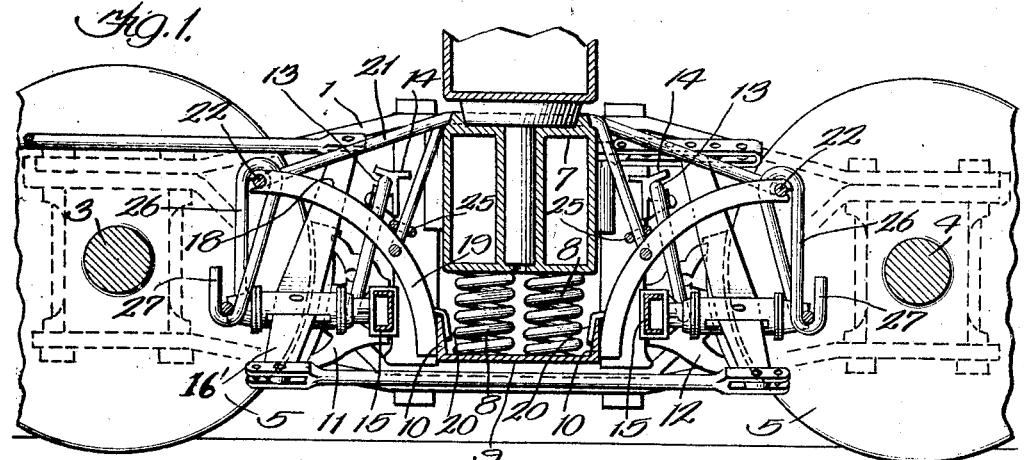
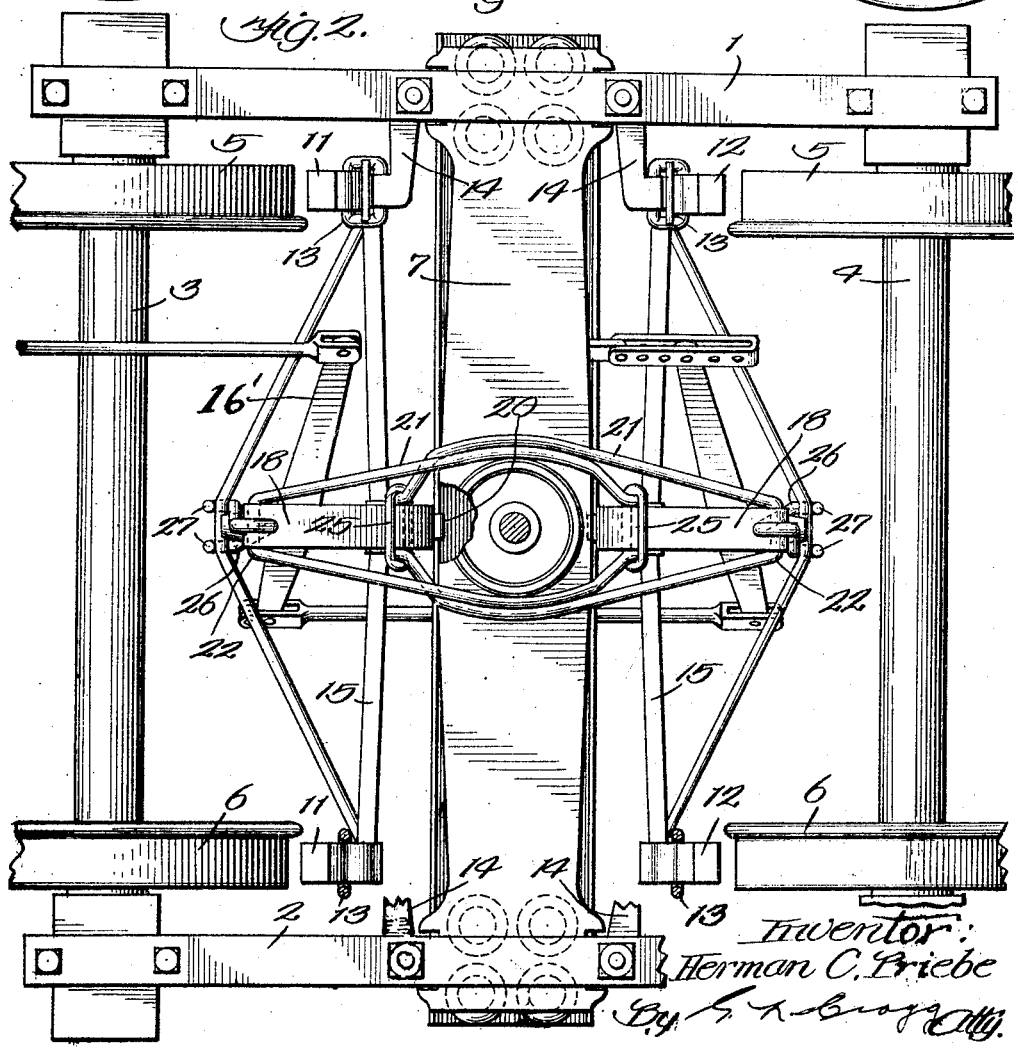
Inventor:
Herman C. Priebe Sept. 1, 1925.  
H. C. PRIEBE  
CAR TRUCK  
Filed May 27, 1924  
1,551,905  
2 Sheets-Sheet 2

Inventor:  
Herman C. Priebe

Patented Sept. 1, 1925.

1,551,905

UNITED STATES PATENT OFFICE.

HERMAN C. PRIEBE, OF BLUE ISLAND, ILLINOIS.

CAR TRUCK.

Application filed May 27, 1924. Serial No. 716,262.

*To all whom it may concern:*

Be it known that I, HERMAN C. PRIEBE, a citizen of the United States, residing at Blue Island, in the county of Cook and the State of Illinois, have invented a certain new and useful Improvement in Car Trucks, of which the following is a full, clear, concise, and exact description.

My invention relates to car trucks and resides in improved means for assembling the brake beams thereof.

In carrying out my invention, the brake beams of a car truck have carriers in supporting relation thereto that are positioned by the spring planks, with the aid of connections that are supported by the truck bolster.

Figure 3:
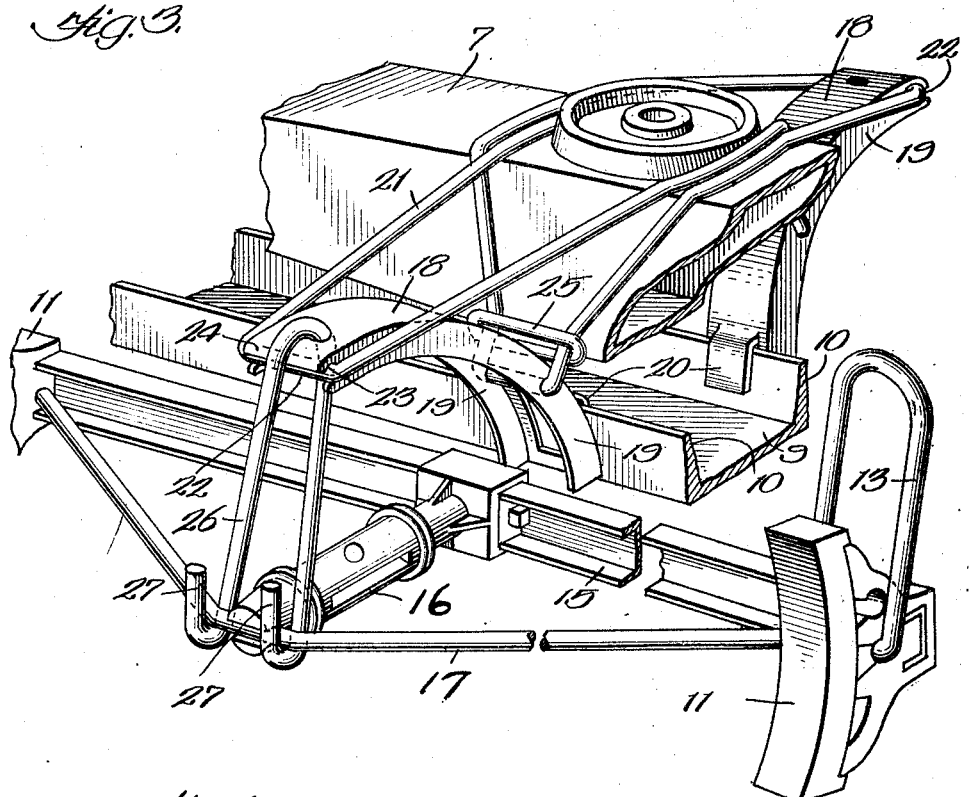
Figure 4:
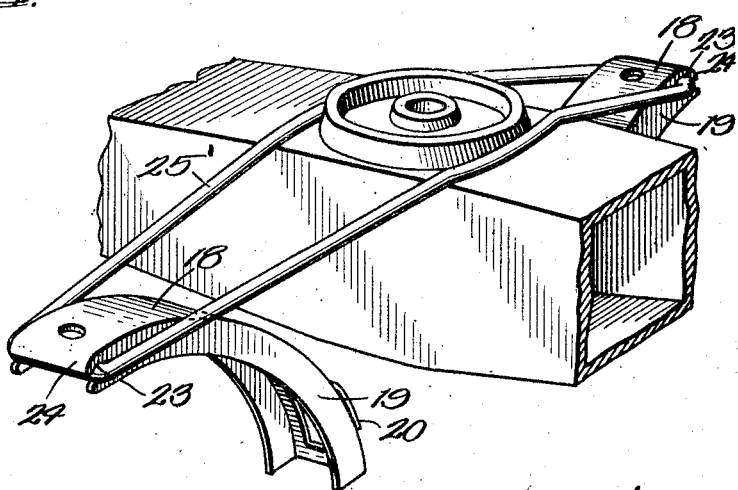

The invention will be more fully explained in connection with the accompanying drawings in which Fig. 1 is a longitudinal sectional elevation of a car truck constructed in accordance with one embodiment of the invention; Fig. 2 is a plan view of the form of the invention shown in Fig. 1; Fig. 3 is a perspective view of the form of the invention shown in Figs. 1 and 2; and Fig. 4 is a perspective view illustrating another embodiment of the invention.

The side frames 1, 2 of the truck are journaled upon the axles 3, 4 of the car wheels 5, 6, in a manner well known. The truck bolster 7 extends across the space between the side frames and projects, at its ends, through the side frames. The bolster is supported upon upright coiled springs 8 which are placed upon a spring plank 9. This plank is desirably formed of channel iron with its side flanges 10 projecting upwardly, as usual.

Brakes 11, 12 are presented to the car wheels and are carried by the hangers 13. These hangers are desirably in the form of links which depend from the brackets 14 provided upon the side frames. The brakes on each side of the truck are assembled with the ends of the corresponding brake beam 15. Each brake beam, as illustrated, has one end of a fulcrum post 16 assembled with its mid portion, a slot in the other end of this post receiving the bight portion of a truss rod 17 whose ends are secured to the brakes upon the ends of the corresponding beam. A braket 18, desirably formed of channel iron suitably curved and with its flanges 19 extending downwardly, is provided at the midportion of and at each upright side of the bolster and at the mid portion of and at the adjacent upright side 10 of the underlying spring plank, this bracket overhanging the adjacent brake beam. Each bracket 18 is desirably formed with a downwardly projecting ear 20 struck inwardly from the base of this bracket and spaced sufficiently apart therefrom to receive the adjacent spring plank flange 10 between it and the body of the bracket. By this arrangement the spring plank takes part in both supporting and positioning the brackets 18, the bases of the ears 20 resting upon the top edges of the spring plank flanges 10. In the form of the invention, illustrated in Figs. 1, 2, and 3, each bracket 18 is further positioned and supported by a looped link 21 having a bight portion 22 passing through eyes 23 formed in the bracket flanges 19 and partially closed by downwardly curling the adjacent end of the base portion of the bracket 18 as indicated at 24. Brake operating levers 16' of the usual brake operating mechanism are fulcrumed in posts 16.

In the form of the invention illustrated in Figs. 1, 2 and 3, the sides of each link 21 extend from the bracket 18 with which it is assembled across the top of the truck bolster upon which such link bears and thence through the flanges 19 of the other bracket 18 as illustrated. The ends of the sides of the links 21 are passed from the outer sides of the bracket flanges 19 through holes formed therein and into the space between said bracket flanges. Loops 25 embrace the links 21 at the brackets 18 to prevent the withdrawal of the ends of these links from assembly with these brackets.

In the form of the invention illustrated in Fig. 4, a unitary linkage 25' extends across the central portion of the top of the bolster and is received at its ends in the eyes 23 in both brackets 18. In this embodiment of the invention, the linkage 25 is hollow, being preferably formed of a rod bent into a form which is generally oblong with the ends of the oblong link received in the eyes 23 of both brackets 18.

A brake beam carrier 26 depends from the outer end of each bracket 18, each carrier being preferably in the form of a U shaped link having one side which is received, adjacent the bight of the carrier, through a hole in the adjacent bracket, this connection permitting the carrier to turn as the brake beam swings. The bight portion of each carrier also encloses the ends of the linkage 21 or 25 where this linkage is assembled with the brackets 18, further to assure the maintenance of the assembly of such linkage with these brackets. The lower ends 27 of the carriers are bent upwardly to form hook which receives the rods 17.

It is obvious that changes may be made without departing from the invention.

Having thus described my invention I claim as new:—

1. In a car truck, the combination with the side frames thereof; of a truck bolster; springs supporting the bolster; a spring plank supporting the springs; wheels carrying said side frames; brakes for said wheels; a brake beam having a brake upon each end; and a carrier in supporting relation to the brake beam and jointly positioned by the bolster and plank.

2. In a car truck, the combination with the side frames thereof; of a truck bolster; springs supporting the bolster; a spring plank supporting the springs; wheels carrying said side frames; brakes for said wheels; a brake beam having a brake upon each end; a fulcrum post upon a mid portion of the brake beam; an operating lever upon said fulcrum post; and a carrier for said fulcrum post and jointly positioned by the bolster and plank.

3. In a car truck, the combination with the side frames thereof; of a truck bolster; springs supporting the bolster; a spring plank supporting the springs; wheels carrying said side frames; brakes for said wheels; a brake beam having a brake upon each end; a fulcrum post having one end assembled with a mid portion of said brake beam; a rod assembled at its ends with end portions of the brake beam and engaged at its mid portion by the other end of said fulcrum post; an operating lever upon said fulcrum post; and a carrier in supporting engagement with said rod and jointly positioned by the bolster and plank.

4. In a car truck, the combination with the side frames thereof; of a truck bolster; springs supporting the bolster; a spring plank supporting the springs; wheels carrying said side frames; brakes for said wheels; a brake beam having a brake upon each end; beam and the brakes thereon; a fulcrum post having one end assembled with a mid portion of said brake beam; a rod assembled at its ends with end portions of the brake beam and engaged at its mid portion by the other end of said fulcrum post; an operating lever upon said fulcrum post; a bracket overhanging the beam and jointly positioned by the bolster and plank; and a carrier upon the bracket and in supporting engagement with said rod.

5. In a car truck, the combination with the side frames thereof; of a truck bolster; springs supporting the bolster; a spring plank supporting the springs; wheels carrying said side frames; brakes for said wheels; a brake beam having a brake upon each end; brake hangers upon the side frames and carrying the ends of said brake beam and the brakes thereon; a fulcrum post having one end assembled with a mid portion of said brake beam; a rod assembled at its ends with end portions of the brake beam and engaged at its mid portion by the other end of said fulcrum post; an operating lever upon said fulcrum post; a bracket overhanging the beam and jointly positioned by the bolster and plank; and a carrier upon the bracket in the form of a U-shaped loop whose bight is mounted to turn upon the bracket and whose ends are shaped into hooks receiving and supporting said rod.

6. In a car truck, the combination with the side frames thereof; of a truck bolster; springs supporting the bolster; a spring plank supporting the springs; wheels carrying said side frames; brakes for said wheels; a brake beam having a brake upon each end; brake hangers upon the side frames and carrying the ends of said brake beam and the brakes thereon; a bracket jointly positioned by the bolster and plank; and a carrier mounted to turn upon said bracket and having supporting connection with said brake beam.

7. In a car truck, the combination with the side frames thereof; of a truck bolster; springs supporting the bolster; a spring plank supporting the springs; wheels carrying said side frames; brakes for said wheels; a brake beam having a brake upon each end; brake hangers upon the side frames and carrying the ends of said brake beam and the brakes thereon; a bracket jointly positioned by the bolster and plank; and a carrier mounted upon said bracket and having supporting connection with said brake beam.

8. In a car truck, the combination with the side frames thereof; of a truck bolster; springs supporting the bolster; a spring plank supporting the springs; wheels carrying the side frames; brakes for said wheels; a brake beam having a brake upon each end; a bracket upon the spring plank and having a formation engaging the plank and holding it in assembly with the plank; a carrier upon the bracket and in supporting relation to the brake beam; and linkage supported by the truck bolster and in supporting relation to said bracket.

9. In a car truck, the combination with the side frames thereof; of a truck bolster; springs supporting the bolster; a spring plank supporting the springs and having an upwardly projecting flange along the same; wheels carrying the side frames; brakes for said wheels; a brake beam having a brake upon each end; a bracket upon the spring plank and having a downwardly projecting ear spaced apart from the bracket and receiving between it and the bracket the flange on the plank to hold the bracket in assembly with the plank; a carrier upon the bracket and in supporting relation to the brake beam; and linkage supported by the truck bolster and in supporting relation to said bracket.

10. In a car truck, the combination with the side frames thereof; of a truck bolster; springs supporting the bolster; a spring plank supporting the springs; two car wheels at each side of the frame; brakes for said wheels; two brake beams between which the bolster is located and each having a brake on each end thereof; two brackets, one at each side of the truck bolster; a carrier depending from each bracket and in supporting relation to the contiguous brake beam; and two links bearing upon the bolster and each connecting the brackets.

11. In a car truck, the combination with the side frames thereof; of a truck bolster; springs supporting the bolster; a spring plank supporting the springs; two car wheels at each side of the frame; brakes for said wheels; two brake beams between which the bolster is located and each having a brake on each end thereof; two brackets, one at each side of the truck bolster; a carrier depending from each bracket and in supporting relation to the contiguous brake beam; and linkage bearing upon the bolster and connecting the brackets.

12. In a car truck, the combination with the side frames thereof; of a truck bolster; springs supporting the bolster; a spring plank supporting the springs; two car wheels at each side of the frame; brakes for said wheels; two brake beams between which the bolster is located and each having a brake on each end thereof; two brackets, one at each side of the truck bolster; a carrier depending from each bracket and in supporting relation to the contiguous brake beam; and two links bearing upon the bolster and each connecting the brackets, said spring plank being also in positioning relation to the brackets.

13. In a car truck, the combination with the side frames thereof; of a truck bolster; springs supporting the bolster; a spring plank supporting the springs; two car wheels at each side of the frame; brakes for said wheels; two brake beams between which the bolster is located and each having a brake on each end thereof; two brackets, one at each side of the truck bolster; a carrier depending from each bracket and in supporting relation to the contiguous brake beam; and linkage bearing upon the bolster and connecting the brackets, said spring plank being also in positioning relation to the brackets.

14. In a car truck, the combination with the side frames thereof; of a truck bolster; springs supporting the bolster; a spring plank supporting the springs; two car wheels at each side of the frame; brakes for said wheels; two brake beams between which the bolster is located and each having a brake on each end thereof; two brackets, one at each side of the truck bolster; a carrier depending from each bracket and in supporting relation to the contiguous brake beam; and linkage bearing upon the bolster and connecting the brackets, said spring plank being also in positioning relation to the brackets and having upwardly extending flanges received between the brackets and depending ears carried by the brackets.

15. In a car truck, the combination with the side frames thereof; of a truck bolster; springs supporting the bolster; a spring plank supporting the springs; two car wheels at each side of the frame; brakes for said wheels; two brake beams between which the bolster is located and each having a brake on each end thereof; two brackets, one at each side of the truck bolster; a carrier depending from each bracket and in supporting relation to the contiguous brake beam; and linkage bearing upon the bolster and connecting the brackets, said spring plank being also in positioning relation to the brackets and having upwardly extending flanges received between the brackets and depending ears carried by the brackets.

In witness whereof, I hereunto subscribe my name.

HERMAN C. PRIEBE.